(12) United States Patent
Bouwmeester et al.

(10) Patent No.: US 8,298,617 B2
(45) Date of Patent: Oct. 30, 2012

(54) PROCESS FOR THE PREPARATION OF A CROSS-LINKED RUBBER ARTICLE

(75) Inventors: Johannes Gerhardus Bernardus Bouwmeester, Zutphen (NL); Robert Alex De Gunst, Deventer (NL); Haimo Tonnaer, Deventer (NL)

(73) Assignee: Akzo Nobel N.V., Arnhem (NL)

( * ) Notice: Subject to any disclaimer, the term of this patent is extended or adjusted under 35 U.S.C. 154(b) by 487 days.

(21) Appl. No.: 12/519,854

(22) PCT Filed: Dec. 14, 2007

(86) PCT No.: PCT/EP2007/063969
§ 371 (c)(1),
(2), (4) Date: Jul. 28, 2009

(87) PCT Pub. No.: WO2008/074744
PCT Pub. Date: Jun. 26, 2008

(65) Prior Publication Data
US 2010/0068560 A1    Mar. 18, 2010

Related U.S. Application Data

(60) Provisional application No. 60/898,795, filed on Jan. 31, 2007.

(30) Foreign Application Priority Data

Dec. 18, 2006 (EP) .................................... 06126407

(51) Int. Cl.
*B05D 3/02* (2006.01)
(52) U.S. Cl. ...................... 427/372.2; 427/422; 427/427; 427/427.7; 427/430.1

(58) Field of Classification Search .................. None
See application file for complete search history.

(56) References Cited

U.S. PATENT DOCUMENTS

| 4,439,388 A | * | 3/1984 | Groepper | 264/130 |
| 4,743,656 A | * | 5/1988 | Wingrove | 525/211 |
| 4,814,384 A | * | 3/1989 | Mitchell et al. | 525/211 |
| 6,747,099 B1 | * | 6/2004 | Novits et al. | 525/330.9 |
| 2004/0019138 A1 | * | 1/2004 | Voorheis et al. | 524/100 |
| 2007/0208135 A1 | | 9/2007 | Gervat et al. | |

FOREIGN PATENT DOCUMENTS

| EP | 1 191 061 | 3/2002 |
| EP | 1 298 166 | 4/2003 |
| WO | WO 00/53649 | 9/2000 |
| WO | WO 2005/082996 | 9/2005 |
| WO | WO 2006/012912 | 2/2006 |

OTHER PUBLICATIONS

J. Groepper, *Kautchuk + Gummi Kunststoffe*, vol. 36, pp. 466-470, (1983).
International Search Report and Written Opinion, International PCT Application No. PCT/EP2007/063969, mailed Apr. 1, 2008.
International Preliminary Report on Patentability, International PCT Application No. PCT/EP2007/063969, mailed Nov. 12, 2008.
European Search Report, European Application No. EP 06 12 6407 dated Feb. 19, 2007.

* cited by examiner

*Primary Examiner* — Erma Cameron
(74) *Attorney, Agent, or Firm* — Robert C. Morriss

(57) ABSTRACT

Process for preparing a cross-linked rubber article comprising the steps of: a) applying a sulfur-containing composition to the surface of a pre-shaped peroxide-containing cross-linkable rubber article to provide a sulfur-coated article, and b) cross-linking the rubber by heating the sulfur-coated article, optionally in the presence of air, at a temperature in the range of 80 to 300° C. to obtain the cross-linked rubber article.

12 Claims, No Drawings

US 8,298,617 B2

PROCESS FOR THE PREPARATION OF A CROSS-LINKED RUBBER ARTICLE

REFERENCE TO RELATED APPLICATION(s)

This application is the U.S. National Phase of PCT/EP2007/063969 filed on Dec. 14, 2007 and claims the benefit of U.S. Provisional Application No. 60/898,795 filed on Jan. 31, 2007.

The present invention relates to a process for the preparation of a cross-linked rubber article and to the rubber article obtainable by this process.

Rubbers are generally cross-linked using either peroxide or sulfur as cross-linking agent. Compared to cross-linking with sulfur, cross-linking with peroxide offers superior heat resistance, compression set, electrical insulation, and—when compounded with coloured substances—coloration and colour stability. However, cross-linking with peroxides is hindered by oxygen. So, when cross-linking is carried out in the presence of air, on the surface of rubber it does not proceed to an adequate extent, leading to various problems such as extreme tackiness, reduced strength, and insufficient hardness. Hence, the resulting articles have a tacky surface, are readily scratched, and are poor in wear resistance and slipperiness.

For this reason, mostly air-closed techniques are used for peroxide-induced cross-linking, such as compression moulding, injection moulding, and salt bath vulcanization.

Another way to deal with oxygen inhibition has been described by J. Groepper, Kautchuk+Gummi Kunststoffe, Vol. 36, 1983, pp. 466-470, which discloses coating of the surface of a cross-linkable rubber article with boric acid, prior to its cross-linking in the presence of air. This prior art document further mentions that although powdering of the rubber surface with sulfur or tetramethylthiuram disulfide (TMTD) also leads to good results, the extreme smell, toxicity, and fire risk associated with their vapours prevent their use in practice.

The object of the present invention is to provide a process for cross-linking a pre-shaped peroxide-containing cross-linkable rubber article in the presence of air which leads to cross-linked rubber articles with a tack-free surface and sufficient strength and hardness. Further, compared to sulfur powdering of a rubber surface, the process according to the invention gives satisfying results with smaller amounts of sulfur. Apart from an economical advantage, this also reduces the odour and the toxicological and fire risks during said process.

The invention pertains to a process for preparing a cross-linked rubber article comprising the steps of:
 a) applying a sulfur-containing composition to the surface of a pre-shaped peroxide-containing cross-linkable rubber article to provide a sulfur-coated article, and
 b) cross-linking the rubber by heating the sulfur-coated article, optionally in the presence of air, at a temperature in the range of 80 to 300° C. to obtain the cross-linked rubber article.

The invention further pertains to a process for preparing a cross-linked rubber article comprising the steps of
 a) applying a sulfur-containing aqueous suspension to the surface of a pre-shaped peroxide-containing cross-linkable rubber article to provide a sulfur-coated article, and
 b) cross-linking the rubber by heating the sulfur-coated article at a temperature in the range of 80 to 300° C., optionally in the presence of air, to obtain a cross-linked rubber article.

The processes of the invention allow for good cross-linking characteristics even in the presence of air, which in turn causes the mechanical properties of the resulting cross-linked rubber to be comparable to anaerobic cross-linking processes. Moreover, the use of the sulfur-containing composition requires a reduction in the amount of sulfur compared to applying powders which solely contain sulfur. The sulfur-containing compositions have an improved wetting behaviour and allow for a better distribution of the sulfur particles on the surface of the cross-linkable rubber article.

In addition, the sulfur-containing compositions, and in particular the sulfur-containing aqueous suspensions, have improved organoleptic properties, i.e. a considerable reduction in smell during the process of the invention.

Furthermore, the aqueous suspensions cause the sulfur to be flammable at higher temperatures than the sulfur powders.

Next to sulfur particles the sulfur-containing composition comprises a distribution medium which improves the wettability on the surface of the cross-linkable rubber article. The distribution medium may be another solid compound such as a wax or a suspending medium such as an aqueous medium or another solvent in which the sulfur particles can be dispersed. Preferably, the sulfur-containing composition is in the form of a sulfur-containing suspension and most preferably in the form of a sulfur-containing aqueous suspension.

The sulfur concentration of the composition preferably is at least 5 wt %, more preferably at least 15 wt %, and most preferably at least 25 wt %. Said sulfur concentration preferably is not higher than 95 wt %, more preferably not higher than 75 wt %, and most preferably not higher than 50 wt %, all based on the total weight of the suspension.

It is preferred to have a good wetting of the pre-shaped rubber article surface with the sulfur-containing composition, preferably an aqueous sulfur-containing suspension. Therefore, it may be desirable, and in general it will be preferred, that the aqueous suspension contains wetting agents. As wetting agents, cationic, anionic or non-ionic surfactants may be used. Examples of suitable wetting agents are alkylbenzene sulfonate, arylbenzene sulfonate, ethoxylated alcohols, glycolic acid ethoxylate-4-nonylphenyl ether, and combinations thereof.

Further, the suspension may contain stabilizers, such as clays (e.g. bentonite), detergents, and/or emulsifiers.

The suspension can be prepared by simply mixing the sulfur powder with water and optional additives (e.g. wetting agents, emulsifiers, detergents, stabilizers). The resulting mixture is preferably milled, for instance by ball milling or high-shear milling.

The sulfur-containing composition, in particular the sulfur-containing aqueous suspension, to be applied on the pre-shaped rubber article's surface preferably contains sulfur particles of which 90% have a diameter of less than 150 microns, more preferably of less than 100 microns, even more preferably of less than 80 microns, still more preferably of less than 70 microns, yet more preferably of less than 60 microns, even more preferably still of less than 50 microns, and most preferably of less than 25 microns, as measured in the aqueous suspension using laser diffraction, in accordance with ISO 9276-1 and ISO 9276-2.

The sulfur-containing composition can be applied to the surface of the pre-shaped peroxide-containing cross-linkable rubber article in various ways: by dipping the pre-shaped article in the suspension or by brushing or spraying the suspension on the article's surface, for instance by using a continuous coater. The composition, and in particular the aqueous suspension, is preferably applied to the surface in an amount of at least 0.005 mg S/cm$^2$, more preferably of at least 0.01 mg S/cm², and most preferably of at least 0.1 mg S/cm². The composition or aqueous suspension is preferably applied to the surface in an amount of not more than 10 mg S/cm² and more preferably of not more than 1 mg S/cm².

The sulfur-coated article is subsequently heated to a temperature of from 80° C., preferably from 120° C., more preferably from 140° C., up to 300° C., preferably up to 230° C., in the presence of air. This heating can be performed using an oven (e.g. a tube oven), an autoclave, ultra high frequency (UHF), UV, steam, or hot air, or a combination thereof. The sulfur-coated article is heated for a preferred time period of at least 1 minute, more preferably at least 3 minutes, and most preferably at least 5 minutes. This time period preferably is not more than 2 hours, more preferably not more than 60 minutes, and most preferably not more than 30 minutes.

At the start of the heating step, the sulfur coating should still contain water, which means that no drying step is performed to remove the water from the suspension prior to said heating step.

Suitable types of cross-linkable rubber to be used in the process of the present invention include ethylene-propylene copolymers (EPM), ethylene-propylene diene monomer copolymers (EPDM), styrene-butadiene rubber (SBR), acrylonitrile-butadiene rubber (NBR), natural rubber (cis-1,4-polyisoprene; NR), isoprene rubber (IR), ethylene-vinyl acetate copolymers (EVA), acrylonitrile-butadiene-styrene copolymers (ABS), styrene-isoprene-styrene copolymers (SIS), chloroprene rubber (CR), chlorinated polyethylene (CM), polyurethane rubber (AU), high density polyethylene (HDPE), low density polyethylene (LDPE), and polymethane rubber.

Suitable peroxides to be present in the cross-linkable rubber are perketals, peresters, dialkyl peroxides, diacyl peroxides, trioxepane compounds of the following formula

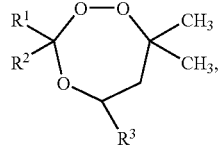

wherein $R^1$, $R^2$, and $R^3$ are independently selected from hydrogen and a substituted or unsubstituted hydrocarbyl group, and cyclic ketone peroxides with a structure represented by the formulae I-III:

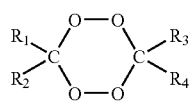

I

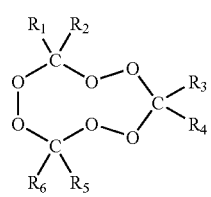

II

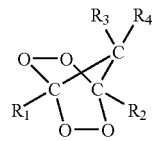

III wherein $R_1$-$R_6$ are independently selected from the group consisting of hydrogen, $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include non-cyclic or branched alkyl moieties; and each of $R_1$-$R_6$ may optionally be substituted with one or more groups selected from $C_1$-$C_{20}$ alkyl, linear or branched, $C_3$-$C_{20}$ cycloalkyl, $C_6$-$C_{20}$ aryl, $C_7$-$C_{20}$ aralkyl, hydroxy, $C_1$-$C_{20}$ alkoxy, $C_6$-$C_{20}$ aryloxy, $C_7$-$C_{20}$ aralkoxy, $C_7$-$C_{20}$ alkaryloxy, $R_1C(O)O-$, $R_1OC(O)-$, halogen, carboxy, nitrile, and amido; or $R_1/R_2$, $R_3/R_4$, and $R_5/R_6$ may each, together with the carbon atom to which they are attached, form a 3 to 20 atom-membered cycloaliphatic ring which may optionally be substituted with one or more groups selected from $C_1$-$C_{20}$ alkyl, non-cyclic or branched, $C_3$-$C_{20}$ cycloalkyl, $C_6$-$C_{20}$ aryl, $C_7$-$C_{20}$ aralkyl, hydroxy, $C_1$-$C_{20}$ alkoxy, $C_6$-$C_{20}$ aryloxy, $C_7$-$C_{20}$ aralkoxy, $C_7$-$C_{20}$ alkaryloxy, $R_1C(O)O-$, $R_1OC(O)-$, halogen, carboxy, nitrile, and amido.

More preferred peroxides are selected from: dialkyl peroxides, such as di-cumyl peroxide (Perkadox® BC), t-butyl cumyl peroxide (Trigonox® T), di-t-butyl peroxide (Trigonox® B), di(t-butyl peroxyisopropyl)benzene in the meta, para or mixed meta/para form (Perkadox 14), 2,5-dimethyl 2,5-di(t-butyl peroxy)hexane (Trigonox® 101), 2,5 dimethyl 2,5-di(t-butyl peroxy)hexyne-3 (Trigonox® 145), t-butyl isopropyl cumyl peroxide, di-t-amyl peroxide (Trigonox® 201), and cumyl isopropyl cumyl peroxide; peroxy esters, such as: di(t-butyl peroxy)phthalate, t-butyl peroxy benzoate (Trigonox® C), t-butyl peroxy acetate (Trigonox® F), t-butyl peroxy isopropyl carbonate (Trigonox® BPIC), t-butyl peroxy-2-methyl benzoate (Trigonox® 97), t-butyl peroxy laurate, t-butyl peroxy diethyl acetate (Trigonox® 27), t-butyl peroxy isobutyrate (Trigonox® 41), t-butyl peroxy-3,5,5-trimethylhexanoate (Trigonox® 42), t-amyl peroxy benzoate (Trigonox® 127), and t-amyl peroxy acetate; peroxy ketals, such as ethyl 3,3-di(t-butyl peroxy) butyrate, ethyl 3,3-di(t-amyl peroxy)butyrate, n-butyl 4,4-di(t-butyl peroxy) valerate, 2,2-di (t-amyl peroxy) propane, 2,2-di(t-butyl peroxy)butane (Trigonox® D), 1,1-di(t-butyl peroxy)cyclohexane (Trigonox® 22), 1,1-di(t-butyl peroxy)-3,5,5-trimethyl cyclohexane (Trigonox® 29), and 1,1-di(t-amyl peroxy) cyclohexane (Trigonox® 122); trioxepanes, such as 3,3,5,7,7-pentamethyl-1,2,4-trioxepane (Trigonox® 311); and cyclic ketone peroxides, such as 3,6,9-triethyl-3,6,9-trimethyl-1,4,7-triperoxononane (Trigonox® 301).

The amount of peroxide to be present in the pre-shaped peroxide-containing cross-linkable rubber article ranges from 0.1, preferably from 1.0, more preferably from 2.0 parts by weight, up to 10, preferably up to 8, most preferably up to 6 parts by weight, based on the weight of the rubber.

Besides peroxides, the pre-shaped cross-linkable rubber article may contain the customary additives, in their usual amounts. Examples of such additives are reinforcing agents or fillers such as carbon black, silica, clay, chalk, talc, aluminium hydroxide, magnesium hydroxide, and calcium carbonate, lubricants, tackifiers, waxes, antioxidants, pigments, UV-stabilization agents, blowing agents, nucleating agents, accelerators, sulfur, ZnO, extender oils such as paraffinic oils (e.g. stearic acid), voltage stabilizers, water-free retardants, metal deactivators, coupling agents, dyes, and colorants.

The pre-shaped peroxide-containing cross-linkable rubber article will generally be prepared by introducing the peroxide and optional additives into the rubber, followed by shaping this mixture into the desired form.

The peroxide and the optional additives can be introduced into the rubber by thorough mixing. If the peroxide is a thermally labile compound, this means that mixing is typically done at temperatures where the half-life of the peroxide is more than 0.5 hour, preferably more than 1 hour, even more preferably more than 2 hours. In practice, the temperature of the rubber is limited to 150° C. during the mixing phase. The mixing can be achieved in various ways, as is known to the skilled person. For instance, the components may be milled on a variety of apparatuses including multi-roll mills, screw mills, continuous mixers, compounding extruders, and Banbury mixers, or dissolved in mutual or compatible solvents. When all of the solid components of the composition are available in the form of a powder, or as small particles, the compositions are most conveniently prepared by first making a blend of the components, such as in a Banbury mixer or a continuous extruder, and then masticating this blend on a heated mill, for instance a two-roll mill, and continuing with the milling until an intimate mixture of the components is obtained. Alternatively, a master batch containing the rubber and one or more antioxidants may be combined with the peroxide and the optional additives.

Where the rubber is not available in the powder form, the mixtures may be made by introducing the rubber to the mill, masticating it until it forms a band around one roll (i.e. a mixing bank), after which the remaining components, either as a blend or individually, are added and the milling is continued until an intimate mixture is obtained. The rolls are preferably kept at a temperature which is in the range of about 25 to 150° C., more preferably 50-120° C., and below the rapid decomposition temperature of the peroxide.

The resulting peroxide-containing cross-linkable rubber is then shaped into the desired form, for instance by extrusion, in order to obtain a pre-shaped peroxide-containing cross-linkable rubber article. This pre-shaped peroxide-containing cross-linkable rubber article can have the form of a sheet, tube (e.g. cable, tube, hose), window, building, or car profile, or any other suitable form.

In one embodiment, the process according to the invention is a continuous process for the preparation of a cross-linked rubber article, comprising the steps of:
(i) shaping a peroxide-containing cross-linkable rubber to form a pre-shaped peroxide-containing cross-linkable rubber article,
(ii) applying a sulfur-containing composition to the surface of the pre-shaped peroxide-containing cross-linkable rubber article to provide a sulfur-coated article, and
(iii) cross-linking the rubber by heating the sulfur-coated article at a temperature in the range of 80 to 300° C., optionally in the presence of air, to obtain the cross-linked rubber article,
all in a continuous fashion.

The cross-linked rubber articles resulting from the process of the present invention can have various applications, e.g. tyre compositions such as tread, undertread, sidewall, wire skim, inner liner, and bead compounds; industrial rubber compositions such as hoses, belts, tubes, engine mounts, shock absorbers and isolators, weather stripping, mouldings, and vehicle bumpers; and wire and cable such as semi-conductor and insulating compounds. They are particularly suitable as building, window, and car profiles.

The present invention is illustrated in the following Examples.

EXAMPLES

Example 1

A mixture was prepared comprising 100 parts by weight (pbw) of a medium extended EPDM [containing 100 parts Keltan®578 EPDM, 70 parts SRF black, parts FEF black, and 50 parts Sunpar 2280], 6.3 pbw di(t-butylperoxyisopropyl) benzene (Perkadox® 14, ex-Akzo Nobel), and 8 pbw coated calcium oxide (Calaxol® CP2).

The resulting peroxide-containing rubber was compressed between Mylar film and formed into 0.2 to 0.3 mm sheets. Both sides of these sheets were coated with about 0.5-0.7 mg/cm$^2$ of different sulfur-containing compositions. Powders were applied to the surface using a brush; liquids were applied to the surface using a foam paint roller.

The resulting coated sheets were then cured for 5 minutes at 200° C. in an oven with forced air circulation.

The resulting sheets were tested in a Zwick tensile tester, in accordance with ISO 37. The results are listed in Table 1 below. For comparison, this Table also displays the properties of the uncured rubber article, the rubber article cured without any surface treatment in the presence of air, and the rubber article cured without any surface treatment in the absence of air.

TABLE 1

| | Tensile strength (N/mm$^2$) | Modulus 100% (N/mm$^2$) | Elongation at break (%) |
|---|---|---|---|
| No cure | 4.6 | 1.6 | 700 |
| No air, no surface treatment | 13.6 | 5.0 | 250 |
| Air, no surface treatment | 4.8 | 2.3 | 330 |
| Zinc hexasulfide powder | 12.9 | 4.5 | 350 |
| Tetramethyl thiuramdisulfide Powder | 12.5 | 4.5 | 430 |
| Dipentamethylene thiuramtetrasulfide powder | 11.2 | 4.1 | 370 |
| S-powder[1] | 14.0 | 4.7 | 370 |
| 90 wt % S-powder[1] + 10 wt % wax[2] | 15.2 | 6.4 | 320 |
| Aq. S-suspension (40 wt % S)[3] | 15.1 | 6.4 | 320 |

[1]Crystex ® HS OT20, ex Flexys
[2]Armid ® HT, ex Akzo Nobel, to improve wetting behaviour
[3]50 wt % Bayer ® Garden Microsulfo Spuitzwavel in water + 1 wt % sodium sec-alkane sulfonate (Armostat ® 3002 ex Akzo Nobel), to improving wetting behaviour The tensile test data clearly indicates that without surface treatment of the rubber, the hot air curing process does not lead to cross-linking of the rubber surface. Pre-treatment of the surface with various S-containing compounds improves the cross-linking of the rubber surface. The best results are obtained with sulfur, either as powder—preferably admixed with a wax in order to improve wetting of surface upon melting in the oven—or in the form of an aqueous suspension. This results in even higher tensile strengths and modulus values than upon cure in the absence of air.

The amounts of sulfur required for obtaining the above results using the S-powder and the aqueous S-suspension are 0.57 mg S/cm$^2$ and 0.24 mg S/cm$^2$, respectively. This shows that smaller amounts of sulfur are required if sulfur is applied to the surface in the form of an aqueous suspension instead of as a powder. This is not only of economical, but also of toxicological importance. Further advantages of using sulfur in the form of a suspension instead of a powder are reduced odour, fire risk, and dusting.

In the above Examples, it is noted that considerably less smell is observed upon application of the aqueous suspension and the solid mixture containing wax than is observed when applying the sulfur powder. There is also considerably less smell after curing at 220° C.

It was further found that the articles onto which the sulfur powder is applied burns within 5 minutes when exposed at 240° C., whereas the articles onto which the aqueous suspension or the wax-containing composition was applied remained stable.

Example 2

Aqueous sulfur-containing suspensions containing 50 wt % S were prepared as follows. 50 pbw sulfur powder was ball-milled with 1 pbw of a wetting agent (Tamol NN9104, ex-BASF), 1 pbw bentonite, and 48 pbw water. Different sulfur powders were used, resulting in suspensions with a d90 of 13, 16, and 17 microns, respectively. In other words, 90% of the sulfur particles in the suspensions were below these respective values. The particle size was measured using laser diffraction, according to ISO 9276-1 and ISO 9276-2.

Two hot air pipe ovens (each 1 meter long) were placed in series with a spacing between them of 5 cm. They were equipped with a conveyer belt with drive unit. The ovens were placed downstream of an extruder, the distance between the extruder head and the first oven being 10 cm.

The EPDM/peroxide mixture of Example 1 was extruded in said extruder. Between leaving the extruder and entering the first oven, an aqueous sulfur-containing suspension was applied to the surface of the extruded strip, using a sponge. The ovens were set to a temperature of 220° C. The residence time in the ovens was 11 minutes.

The results are listed in Table 2 below. This Table also shows the results for a blank test, which was performed in the same manner, but without surface treatment.

The scratch resistance of the surface was tested with a sewing pin. The tested surface was analyzed microscopically (magnification: up to 400×). Under the microscope, the sewing pin was pressed by hand into the rubber surface at an angle of about 45°. Crossed lines were drawn in the surface. The penetration of the pin into the surface was assessed as follows: grooves in the surface resulted in a negative (−) evaluation of the scratch resistance; if only lines were observed, without surface penetration, the scratch resistance was evaluated as positive (+). Further, when the surface is cured well, it bends while the pin is pressing the surface.

The scratch resistance test was performed several times on each sample.

TABLE 2

| d90 (microns) | Tensile strength (N/mm$^2$) | Modulus 100% (N/mm$^2$) | Elongation at break (%) | Scratch resistance |
|---|---|---|---|---|
| Blank | 12.0 | 4.4 | 246 | − |
| 13 | 13.9 | 4.1 | 292 | −/+ |
| 16 | 13.7 | 4.3 | 281 | + |
| 17 | 14.0 | 4.1 | 285 | + |

These experiments show that the process according to the invention can be conducted in a continuous fashion, including a shaping, a surface treatment, and a curing step. From Table 2 it can be deduced that the scratch resistance is considerably improved for the treated articles compared to the untreated article.

The invention claimed is:

1. A process for preparing a cross-linked rubber article comprising the steps of:
   a) applying a sulfur-containing composition to the surface of a pre-shaped peroxide-containing cross-linkable rubber article to provide a sulfur-coated article, and
   b) cross-linking the rubber by heating the sulfur-coated article, optionally in the presence of air, at a temperature in the range of 80 to 300° C. to obtain the cross-linked rubber article.

2. The process according to claim 1 wherein the sulfur-containing composition is a sulfur-containing aqueous suspension.

3. The process according to claim 2 wherein the sulfur-containing aqueous suspension contains sulfur particles of which 90% have a diameter of less than 100 microns, when measured in said suspension.

4. The process according to claim 2 wherein the sulfur-containing aqueous suspension is applied to the surface of the pre-shaped peroxide-containing cross-linkable rubber article by dipping said article in the suspension or by brushing or spraying the suspension on the surface of said article.

5. The process according to claim 1 wherein the sulfur concentration of the sulfur-containing composition ranges from 5 to 95 wt %, based on the total weight of the composition.

6. The process according to claim 1 wherein the sulfur-containing composition also
   contains one or more additives selected from the group consisting of clay, stabilizers, emulsifiers, and wetting agents.

7. The process according to claim 1 wherein the sulfur-containing composition is applied to the surface of the pre-shaped peroxide-containing cross-linkable rubber article in an amount of at least 0.005 mg S/cm$^2$.

8. The process according to claim 1 wherein no drying step is performed between steps a) and b).

9. A cross-linked rubber article obtained by the process of claim 1.

10. A continuous process for the preparation of a cross-linked rubber article, comprising the steps of:
    (i) shaping a peroxide-containing cross-linkable rubber to form a pre-shaped peroxide-containing cross-linkable rubber article,
    (ii) applying a sulfur-containing composition to the surface of the pre-shaped peroxide-containing cross-linkable rubber article to provide a sulfur-coated article, and
    (iii) cross-linking the rubber by heating the sulfur-coated article at a temperature in the range of 80 to 300° C., optionally in the presence of air, to obtain the cross-linked rubber article,
    all in a continuous fashion.

11. A cross-linked rubber article obtained by the process of claim 10.

12. A sulphur-coated article obtained by applying a sulfur-containing composition on the surface of a pre-shaped peroxide-containing cross-linkable rubber article, wherein the sulfur-containing composition is a sulfur-containing aqueous suspension.

* * * * *